United States Patent Office 2,753,427
Patented July 3, 1956

2,753,427
GAS-SHIELDED METAL-ARC WELDING

Donald M. Yenni, Williamsville, and Kenneth L. Thomas, Kenmore, N. Y., assignors to Union Carbide and Carbon Corporation, a corporation of New York No Drawing. Application January 5, 1954,
Serial No. 402,406

6 Claims. (Cl. 219—10)

This invention relates to gas-shielded metal-arc welding and, more particularly, to such arc welding with relatively high-current density like that proposed by Muller et al. No. 2,504,868 and Kennedy 2,532,410.

Generally, in shielded-inert-gas-metal-arc or sigma welding, the gas is argon or helium. Recently, as disclosed in the application of R. T. Breymeier, Serial No. 210,397, filed February 10, 1951, in sigma welding carbon steel, however, it has been found beneficial to use argon containing some oxygen such as 1–10% in sigma welding. Also, it has been proposed in Patent No. 2,591,926 to use a mixture of helium and argon as the shielding gas for non-consumable or refractory metal electrode arc welding in which the electrode is tungsten or thoriated tungsten. But it is impossible to predict beforehand that such proposal for that kind of arc welding would be suitable also for sigma welding.

In an investigation of various shielding gases and gas mixtures for sigma welding rimmed, killed or semi-killed carbon steel, we have discovered that wholly unexpected improvements are obtained with a shielding gas consisting of a mixture of helium, argon and carbon dioxide. For example, an arc shielding gas composed of a mixture of 80% helium, 15% argon and 5% carbon dioxide produces a quiet, spatter-free arc, resulting in a satisfactory weld bead deposit. We have established that for sigma welding carbon steel, the most suitable shielding gas is one composed of 40–80% helium, 3–5% carbon dioxide and the balance argon. Satisfactory results are obtainable, however, when the shielding gas consists of 3–10 carbon dioxide, 40–80% helium and the balance argon for sigma welding carbon steel with direct current reverse polarity (DCRP). The carbon dioxide has a stabilizing influence on arc performance when used with a mixture of helium and argon in concentrations not exceeding 10% $CO_2$.

Most of the following performance data were secured in sigma welding single pass beads on one-quarter inch thick carbon steel plate with an electrode, which is sold by the Linde Air Products Company as No. 32 CMS, of one-sixteenth inch diameter. No. 32 CMS welding wire contains about 0.12% carbon, 1.0–1.2% manganese, 0.25% silicon, 0.35% chromium, not more than 0.015% sulphur and the balance iron. Data are given below for sigma welding runs using various helium-argon-carbon dioxide mixtures containing 1, 3, 5 and 10% carbon dioxide.

Beads were made at 25 and 50 ipm with direct current-reverse polarity and at 25 ipm with direct current-straight polarity power. A welding speed of 25 ipm was selected since this represents the maximum speed for producing acceptable welds on ¼-inch thick steel plate with pure argon and is also about the maximum speed for hand welding methods. Although arc current was substantially constant for a given welding speed and polarity, some changes will be noticed in arc operating voltage. The voltage for most satisfactory operation with each shielding gas mixture was selected.

The test beads were intended to have penetration somewhat greater than half the plate thickness or 0.125 inch, and a bead width-to-height ratio of four or more. A desirable dilution is 50% or greater. Dilution is the ratio of melted base metal area to total melted area on the bead cross-section. These conditions apply to double pass, square butt welding.

TABLE I
Sigma welding with helium, argon, $CO_2$ mixtures on ¼-inch mild steel (Part I)

DCRP—25 I. P. M.

| Run | Shielding Gas | | | Weld-Power | | Filler Rod Speed | Spatter | Ht. | Penet. |
|---|---|---|---|---|---|---|---|---|---|
| | He | A | $CO_2$ | Amp. | Volts | | | | |
| 71 | 40 | 59 | 1 | 335 | 29 | 185 | Bad | .065 | .155 |
| 70 | 60 | 39 | 1 | 320 | 32 | 200 | ---do--- | .060 | .155 |
| 69 | 70 | 29 | 1 | 320 | 32 | 185 | ---do--- | .065 | .145 |
| 66 | 40 | 57 | 3 | 350 | 28 | 185 | None | .070 | .140 |
| 65 | 60 | 37 | 3 | 350 | 28 | 195 | ---do--- | .070 | .160 |
| 68 | 70 | 27 | 3 | 335 | 30 | 185 | ---do--- | .070 | .140 |
| 72 | 40 | 55 | 5 | 350 | 28 | 180 | ---do--- | .080 | .140 |
| 73 | 60 | 35 | 5 | 350 | 28 | 185 | ---do--- | .070 | .160 |
| 74 | 70 | 25 | 5 | 350 | 28 | 190 | ---do--- | .080 | .175 |
| 75 | 80 | 15 | 5 | 350 | 28 | 185 | Mild | .070 | .145 |
| 78 | 40 | 50 | 10 | 350 | 28 | 185 | ---do--- | .095 | .160 |
| 77 | 60 | 30 | 10 | 350 | 28 | 200 | ---do--- | .095 | .150 |
| 76 | 70 | 20 | 10 | 350 | 28 | 200 | ---do--- | .095 | .120 |

DCRP—50 I. P. M.

| 86 | 40 | 57 | 3 | 450 | 28 | 390 | Mild | .095 | .170 |
| 88 | 60 | 37 | 3 | 440 | 30 | 360 | ---do--- | .070 | .160 |
| 89 | 70 | 27 | 3 | 440 | 30 | 360 | ---do--- | .075 | .170 |
| 92 | 40 | 55 | 5 | 440 | 30 | 360 | ---do--- | .080 | .170 |
| 91 | 60 | 35 | 5 | 440 | 30 | 360 | ---do--- | .075 | .180 |
| 90 | 70 | 25 | 5 | 440 | 30 | 360 | ---do--- | .075 | .160 |
| 93 | 40 | 50 | 10 | 440 | 30 | 350 | ---do--- | .070 | .170 |
| 94 | 60 | 30 | 10 | 440 | 30 | 350 | ---do--- | .090 | .180 |
| 95 | 70 | 20 | 10 | 440 | 30 | 360 | ---do--- | .080 | .170 |

DCSP—25 I. P. M.

| 82 | 40 | 55 | 5 | 350 | 28 | 340 | Bad | .165 | .060 |
| 81 | 70 | 25 | 5 | 350 | 28 | 375 | ---do--- | .125 | .070 |
| 79 | 40 | 50 | 10 | 350 | 28 | 325 | ---do--- | .095 | .080 |
| 80 | 70 | 20 | 10 | 330 | 30 | 365 | ---do--- | .140 | .055 |

(Part II)

DCRP—25 I. P. M.

| Run | Width | W/H | Area | Dilution | Bead Defects |
|---|---|---|---|---|---|
| 71 | .655 | 10.1 | .061 | 57 | Ropey. |
| 70 | .705 | 11.7 | .080 | 69 | Irregular—pinhole porosity. |
| 69 | .635 | 9.8 | .072 | 63 | Do. |
| 66 | .565 | 8.1 | .065 | 58 | None—smooth, regular. |
| 65 | .600 | 8.6 | .072 | 57 | Do. |
| 68 | .545 | 7.8 | .061 | 61 | Do. |
| 72 | .490 | 6.1 | .059 | 56 | Do. |
| 73 | .540 | 7.7 | .069 | 57 | Do. |
| 74 | .560 | 7.0 | .071 | 58 | Do. |
| 75 | .590 | 8.4 | .069 | 57 | Do. |
| 78 | .485 | 5.1 | .072 | 58 | Peaked. |
| 77 | .490 | 5.2 | .077 | 61 | Do. |
| 76 | .540 | 5.7 | .073 | 59 | Do. |

DCRP—50 I. P. M.

| 86 | .350 | 3.7 | .059 | 54 | Smooth high. |
| 88 | .370 | 5.3 | .053 | 63 | Slight undercut—smooth high. |
| 89 | .380 | 5.1 | .057 | 62 | None—excellent. |
| 92 | .390 | 4.9 | .056 | 61 | None—fairly smooth. |
| 91 | .380 | 5.1 | .057 | 63 | None—good. |
| 90 | .365 | 4.9 | .053 | 59 | None—excellent. |
| 93 | .375 | 5.3 | .057 | 62 | Slight—CLP [1]—excellent. |
| 94 | .350 | 3.9 | .061 | 63 | Slight—CLP and undercut O. K. otherwise. |
| 95 | .365 | 4.6 | .057 | 63 | Slight—CLP and slight undercut. |

[1] CLP is center line porosity.

| | DCSP—25 I. P. M. | | | | |
|---|---|---|---|---|---|
| 82 | .450 | 2.7 | .064 | 34 | Irregular, very high peak. |
| 81 | .495 | 3.9 | .075 | 36 | None—high peak. |
| 79 | .495 | 5.2 | .070 | 50 | None—too shallow. |
| 80 | .540 | 3.9 | .073 | 32 | Too high. |

*Note.*—All weld beads made on ¼ inch CR steel, using ⅟₁₆ inch diameter No. 32 CMS rod.
Total gas flow=100 c. f. h.

Performance with various argon-helium ratios and carbon dioxide concentrations of 1, 3, 5 and 10% are shown in Table I above. Acceptable weld beads were made at 50 ipm using 3% $CO_2$ (run 89), 5% $CO_2$ (run 90), and except for slight center line porosity, using 10% $CO_2$. It is noted that weld bead quality improves with increasing helium content up to 70%, and that 80% (run 75) the bead is excellent though spatter is becoming noticeable. Therefore, a recommended mixture for DCRP welding of mild steel would be 70% helium, 25% argon, 5% $CO_2$.

Dilution and bead width-to-height ratio show that most of these welds have satisfactory cross-sections. Arc operation with such mixtures is remarkably stable and little spatter is experienced. Thus, the addition of carbon dioxide to helium-argon mixture increases arc stability and reduces spatter. Smoothness of weld surface and arc stability are considerably better than that of comparable beads made with oxygen-argon. The increased arc stability and smoothness of operation make the use of helium-argon-oxygen mixtures ideal for hand sigma welding operations.

According to our invention the best shielding gas compositions for use under established sigma welding conditions should contain 3 to 5% carbon dioxide, from 40 to 70% helium and the remainder argon.

The invention obviously is suitable for sigma welding other metals such as stainless steels, as well as carbon steels.

We claim:
1. A shielding gas for direct current reverse polarity sigma welding carbon steel, composed of a mixture containing 3–10% carbon dioxide, 40–80% helium, and 10–57% argon.
2. A shielding gas composition for direct current reverse polarity sigma welding of carbon steel, consisting of 70% helium, 25% argon, and 5% carbon dioxide.
3. A shielding gas for direct current reverse polarity sigma welding carbon steel which is composed of a mixture of carbon dioxide, helium and argon, containing 40–80% helium, 3–5% carbon dioxide, and 15–57% argon.
4. Process of gas-shielded metal-arc welding which comprises striking direct current reverse polarity arc between the work and a fusible metal electrode, feeding such electrode toward such work as molten metal is transferred therefrom to the work through such arc, and shielding the arc and adjacent metal with a gas stream consisting of a mixture containing 40–80% commercially pure helium, 3–5% commercially pure carbon dioxide and 15–57% commercially pure argon.
5. Process as defined by claim 4, in which the work and electrode are composed of carbon steel.
6. Process as defined by claim 4, in which the work and electrode are composed of stainless steel.

References Cited in the file of this patent
UNITED STATES PATENTS

| | | |
|---|---|---|
| 1,519,007 | Paterson | Dec. 9, 1924 |
| 2,504,867 | Muller | Aug. 10, 1950 |
| 2,504,868 | Muller | Aug. 10, 1950 |
| 2,544,711 | Mikhalapov | Mar. 13, 1951 |
| 2,576,793 | Jordan | Nov. 27, 1951 |
| 2,591,926 | Gibson | Apr. 8, 1952 |

OTHER REFERENCES

Arc Welding in Controlled Atmospheres, by Doan and Smith, pp. 110S–116S in March 1940, Welding Research Supplement.